Dec. 15, 1953      L. I. YEOMANS      2,662,286
GRASS SHEARS WITH LATERAL HANDLE ACTION
Filed May 16, 1952
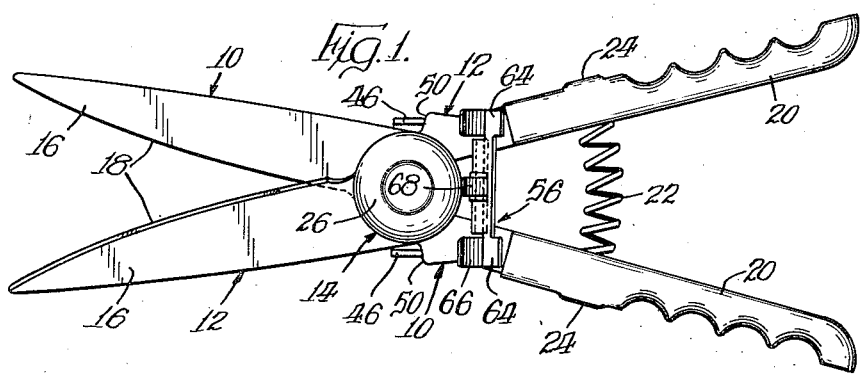
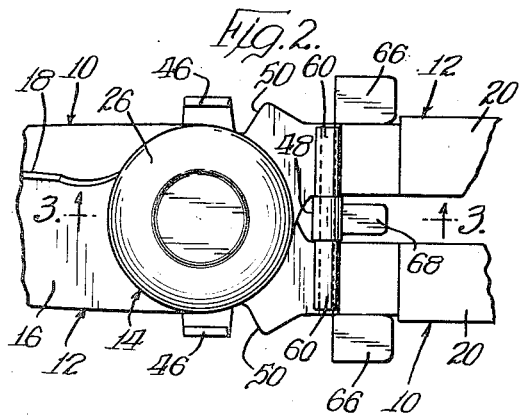
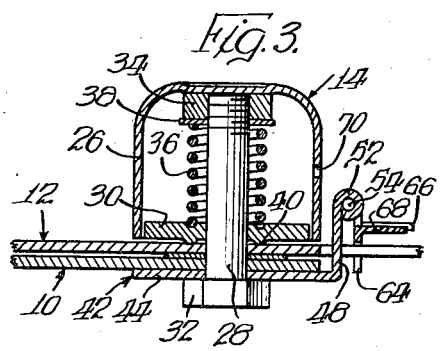
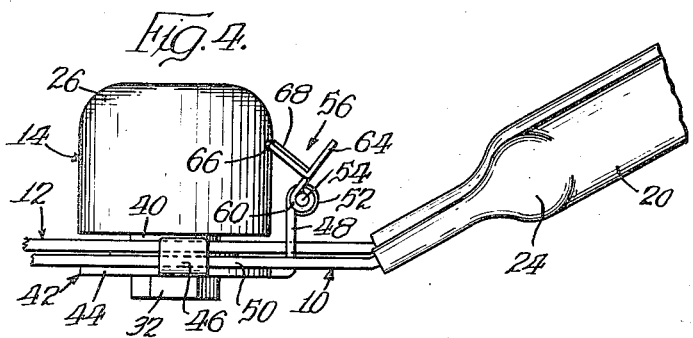
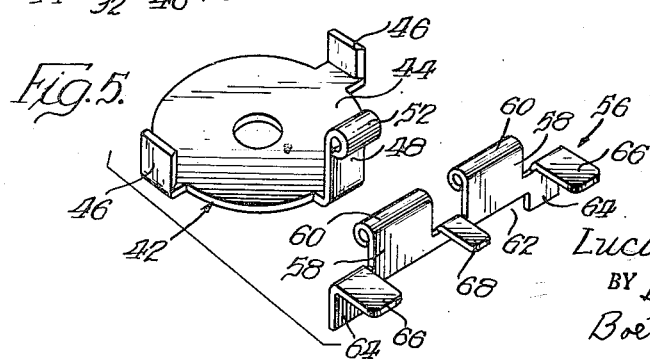
INVENTOR.
Lucien I. Yeomans
BY Brown, Jackson,
Boettcher & Dienner
Attys.

Patented Dec. 15, 1953

2,662,286

UNITED STATES PATENT OFFICE 2,662,286

GRASS SHEARS WITH LATERAL HANDLE ACTION

Lucien I. Yeomans, Chicago, Ill., assignor to Midwest Tool and Cutlery Company, Sturgis, Mich., a corporation of Michigan Application May 16, 1952, Serial No. 288,175

14 Claims. (Cl. 30—262)

The present invention relates to improvements in gardener's grass shears or trimmers and, particularly, to improvements in shears of the type in which the blades are moved in a predetermined plane upon actuation of the handles in a plane parallel to or angularly disposed to that in which the blades are moved.

In one sense, which is very general, the present invention comprises the application of certain broad concepts to a grass shears having lateral handle action, which concepts have been applied in my copending application, Serial No. 288,174, filed May 16, 1952, to a grass shears having vertical or transverse handle action.

The type of cutting instruments to which the present invention applies may generally be considered as comprising a pair of members or blades pivotally interconnected intermediate their ends in criss-cross relation, each blade being provided to opposite sides of the pivot with a cutting portion and a handle portion. I am aware that instruments of the general type are well known. However, prior endeavors in the art have failed to attain the optimum in design and efficiency, particularly in the art of grass shears or trimmers.

It is an object of the present invention to provide improved grass shears that eliminate the disadvantages of prior devices, that are extremely economical of manufacture and assembly, that are neat in appearance, durable and convenient and that provide an efficiency of operation heretofore unattained.

One object of the present invention is the provision of improved grass shears including an improved main pivot wherein the blades are resiliently held in operating engagement and the pivot does not have a rigid connection to either the blades or handles.

Another object of the invention is to provide improved grass shears incorporating improved means for limiting movement of the blades in both directions, which means are automatically self-centering, do not require close tolerances in manufacture and cannot become inoperative or improperly operative in use.

A further object of the invention is the provision of automatic limit stops coacting with the blades to restrain their movement in either direction at predetermined points, supplemented by a manually operable lock to hold the blades in closed position when so desired.

A still further object of the invention is to locate, position and secure all the working parts of the device about, and by means of, a single main pivot.

It is also an object of the invention to provide a shears so constituted that the handles attached to the blades for actuation of the blades serve that purpose only and no working parts of the shears, other than the blades and opening spring, are mounted by or co-act with the handles.

Other objects and advantages of the present invention will become apparent in the following detailed description of a preferred embodiment of the invention.

Now, in order to acquaint those skilled in the art with a manner of constructing and operating the improved grass shears of my invention, I shall describe, in connection with the accompanying drawings, a preferred embodiment of my invention and a mode of constructing the same.

In the drawings, wherein like reference numerals refer to like parts:

Figure 1 is a plan view of the improved grass shears of the present invention, showing the shears in open position;

Figure 2 is a partial plan view of the shears at the main pivot thereof, the view being on an enlarged scale and showing the blades in closed position;

Figure 3 is a longitudinal, vertical section of the main pivot portion of the shears, the view being taken substantially on line 3—3 of Figure 2 and showing the shears locked in closed position;

Figure 4 is a side elevation of the main pivot portion and part of the handles of the improved shears of the invention, the view showing the shears in unlocked position; and Figure 5 is a perspective view of the two elements of the limit stop and blade locking means of the present invention.

Referring now to the drawings, a preferred embodiment of the shears of the present invention is shown as comprising a first or lower blade, indicated generally at 10, a second or upper blade, indicated generally at 12, the two blades being disposed in criss-cross relation, and a main pivot 14 pivotally connecting the blades 10 and 12 at their point of intersection. To one side of the main pivot 14, each of the blades 10 and 12 comprises a cutting portion 16 having a cutting edge 18. To the other side of the main pivot 14, each of the blades comprises a handle portion 20. In actuality, the blades extend only a short distance to the side of the main pivot 14 opposite the cutting portions 16 and thereat are turned upwardly, as is shown in Figure 4, and separate handle members are secured to the upwardly turned portions of the blades. The handles each comprise a member preferably of channel shape in cross section with the base wall thereof disposed to the outside and provided with indentations or the like forming finger grips. At the forward end of each channel shaped handle, the same is crimped inwardly to the upturned end portion of the respective blade and is suitably welded to the respective blade along the open side of the channel. While the relationship or structure of the blades and handles is preferably as stated, it will be apparent that each blade 16 and handle 20 comprises in effect a single blade member with the two members being pivotally connected intermediate their ends in criss-cross relation. While the portions of the blades 16 to which the handles 20 are secured are preferably turned up at an angle to the plane of movement of the cutting portions of the blades, as is shown in Figure 4, to provide for ease and convenience in operation of the shears, it will be apparent that the handles 20 may, if desired, be disposed in the same plane as the cutting portions of the blades, in a plane parallel to the plane of the blades, or at angles other than that shown in Figure 4.

The two blades 10 and 12 are adapted for movement toward and away from each other upon movement of the handles 20 toward and away from each other. For movement toward each other, a squeezing action by the hand of the user is highly convenient and efficient because, as the cut takes place further away from the main pivot 14, the effective leverage of the handles is increased to provide for ease of operation of the shears. Since there is no cut taking place on opening movement of the blades, and since it would be highly inconvenient to require the operator to spread the handles apart manually, a spring 22 is confined between the handles 20 to normally bias the same apart. It will be apparent from the pivotal interconnection of the two blades that opening movement of the handles 20 will automatically result in opening movement of the blades 16. The spring 22 confined between the handle portions 20 is preferably a conventional helically coiled spring, which assumes an arcuate shape when the handles are opened due to the disposition of the handles. To retain the spring 22 in the handles despite the flexing or curvature to which the spring is subjected, each of the handles 20 is provided in the base wall thereof, preferably at or adjacent the junction of the crimped and main portions thereof, with relatively shallow depressions or indentations 24 within which the ends of the springs are received and operatively retained.

The main pivot 14 of the shears comprises a housing 26 in the form of an inverted cup, a pivot pin 28 and a spring pressed member 30. The pivot pin 28 preferably comprises a bolt upon which the blades are pivotally mounted, the bolt having a head 32 upon which the blades rest. The housing 26 is adapted to provide a relatively fixed support for the bolt 30 remotely of the head 32. To this end, a nut 34 is secured, preferably by projection welding, to the top wall of the housing 26. The nut 34 provides a fixed support for the bolt 30, located remotely of the bolt head 32, and at the same time accommodates ready removal of the pivot bolt to provide for repair of the shears.

As is conventional, the cutting portions 16 of the blades 10 and 12 are oppositely curved toward one another, in a direction transverse of the plane thereof, so that the cutting action actually occurs substantially at a single point on the cutting edge 18 of each blade. In other words, as the blades are moved toward one another, the cutting edges of the blades engage at a single point at a time, which point progresses outwardly along the length of the blades away from the pivot 14. This provides a highly efficient cutting action and renders the blades self-sharpening, as is well known in the art. In some prior structures, the described action has been accommodated by the flexibility of the blades themselves. In other structures, the action has been accommodated by providing a loose pivot pin and in still others by providing means for flexibly or resiliently urging the blades toward one another. In my previously identified copending application, I have provided an improved main pivot of the type wherein the blades are resiliently urged toward one another. It is an object of the present invention to incorporate the basic concept of the improved pivot of my copending application in the main pivot of the shears of the present invention, and also to provide a main pivot of additional capabilities and particularly adapted for shears of the type having lateral handle action. To this end, the spring pressed member 30 of the main pivot is disposed within and guided by the housing 26 and is mounted on the pivot pin 28 for movement axially of the housing and the pin. To normally bias the member 30 toward the head 32 of the bolt or pin 28, a coil spring 36 is confined between the member 30 and the fixed support of the pivot pin 28, that is, the top wall of the housing 26, or the nut 34, whereby the blades 10 and 12 are resiliently confined between the head 32 of the pivot pin 28 and the spring pressed member 30. If desired, washer 38 may be suitably confined between the spring 36 and the nut 34 to provide for accurate retention and mounting of the spring 36.

From the foregoing, it will be appreciated that as the blades are moved toward one another, and tend to separate transversely of the plane thereof at portions thereof rearwardly of the engaged cutting edges of the blades, the spring 36 will yield to accommodate relative movement between the blades. Heretofore, the art has suffered from a misconception of the amount of movement that need be accommodated and the amount of spring pressure that need be applied to the blades. In actuality, the spring 36 need not be capable of exerting substantial force, a slight biasing pressure of sufficient magnitude to hold the blades together being all that is required. In addition, the movement that need be accommodated by the main pivot or spring 36 is very slight. For example, with blades having approximately a five-inch cutting edge, only about 0.024 inch of relative movement at the pivot pin need be accommodated. As a margin of safety, and for manufacturing convenience, it is preferred that a clearance of approximately $\frac{1}{32}$ of an inch be provided in the specific example given. According to the present invention, this clearance is provided between the lower edge of the housing 26 and the upper surface of the top blade 12.

In addition to the foregoing, it is highly important that the movement of the blades transversely of the plane thereof be readily accommodated and that the movement be not such as to exert bending force on the pivot pin. According to the present invention, the foregoing factors are taken care of by providing the spring pressed member 30 with an annular projection 40 engaging the top blade 12 to provide a surface on which the blade may readily pivot to impart movement to the member 30 axially of the pin 28. In other words, the annular projection 40 provides a fulcrum about which the blades may pivot to accommodate the self-sharpening action thereof. As pointed out hereinbefore, the spring pressed follower member 30 is received within and guided by the cylindrical housing 26. While the pin 28 freely passes through the central aperture in the annular spring pressed member 30, the fit therebetween is preferably of a quite intimate nature so that the member 30 provides a second support for the pin 28 spaced a substantial distance from the first or relatively fixed support of the pin at the nut 34. Accordingly, the pivot pin has substantial support and provides a relatively fixed pivotal mounting for the blades. The member 30, like substantially all the component parts of the shears of the present invention, is preferably stamped from sheet metal. In the case of the member 30, the same is preferably originally formed with a slightly undersized central aperture and an oversized diameter. The member is then stamped, in a coining operation, to form the projection 40 which, due to the coining, will comprise a smooth surfaced, hemi-torus disposed coaxially of the aperture through the member. Thereafter, the member 30 is placed in a shaving die to properly size and provide finished surfaces for the central aperture and the outer diameter of the member. As will be apparent from a consideration of Figure 3, the coining operation resulting in the formation of the hemi-torus 40 results in the formation of an annular indentation on the opposite side of the member providing a seat for the spring 36.

As will now be apparent, the main pivot 14 of the shears of the present invention has no fixed or rigid connection to the blades and the blades are merely resiliently confined between the head 32 of the bolt 28 and the spring pressed member 30. Accordingly, the pivot, which is free or independent, locates, positions and secures the blades in operative relation.

As will be appreciated, it is necessary in shears of the general type herein referred to that suitable means be provided to limit movement of the shears in both directions, and it is also very desirable to provide means for locking the blades in closed position to reduce danger in handling of the shears and to prevent dulling of the blades when the shears are stored away. Heretofore, motion limiting means have customarily consisted of a first member, such as an elongate stud positioned between the handles and secured to one of the handles, to limit movement of the handles toward one another and a second member, or set of members, such as projections provided on each blade adapted to engage one another, to limit opening movement of the blades and handles. The lock member, which conventionally is a third and separate member, has taken many forms, but usually comprises a spring loop or the like secured to one handle and arranged to receive a stud on the other handle for locking the two handles together in closed position. In my hereinbefore identified copending application, I have disclosed means comprising a single assembly adapted to limit movement of the blades in both directions and to lock the shears in closed position. The assembly provides a first abutment means adapted for cooperation with portions of the handles and/or blades for limiting movement of the handles and blades in both directions and second abutment means associated with the first means and adapted for cooperation with portions of the handles and/or blades for locking the handles and blades in closed position. In my copending application, both said means are incorporated in a single unitary element adapted for cooperation with the handles to accomplish the three functions stated.

It is an object of the present invention to provide combined limiting and locking means in the form of two cooperating members for accomplishing the said three functions. The first member comprises abutment means for limiting movement of the blades in both directions and the second element comprises abutment means carried by the first element for locking the blades in closed position. Referring now particularly to Figure 5, the said first member or element 42 is shown as comprising a washer portion 44, a pair of tabs or abutment portions 46 extending from opposite sides of the washer 44 and turned upwardly at their outer ends, and a third tab or abutment portion 48 of the same general nature as the tabs 46 extending from the washer 44 at a point intermediate the abutment portions 46. The motion limiting member 42 is adapted to be mounted on the pivot pin 28 with the third tab 48 thereof received between the handle portions of the two blades. In other words, the third tab or abutment portion 48 extends into the space between the blades 16 to the handle side of the main pivot 14, as is clearly shown in Figures 1 and 2. The two abutment portions 46 extend laterally outward of the blades and project upwardly at their outer ends into the path of movement of the blades. At the forward edge of the handle portion thereof, each blade is preferably provided with an abutment portion 50 arranged to engage the respective tab or abutment 46 on the limit member 42 to limit opening movement of the blades, as is shown in Figure 1. Each of the tabs 46 is preferably provided with an inclined front edge portion to properly cooperate with the abutment portions 50 provided on the blades. The third tab 48 extends upwardly between the blades and into the path of movement thereof so that upon closing movement, the blades contact the opposite sides of the tab 48 and are stopped thereby in slightly spaced relation, as is shown in Figure 2. Accordingly, it will be appreciated that the member 42 provides abutment portions or means disposed at spaced points in the path of movement of the blades for limiting opening and closing movement of the blades.

As will be apparent, the limit member 42, like the blades 10 and 12, is mounted on and carried by the pivot pin 28 and is resiliently retained on the pin by means of the spring pressed member 30. It is preferred that the limit element 42 be resiliently confined between the head 32 of the bolt 28 and the lower blade member 10 and with the tab portions 46 and 48 thereof projecting upwardly. However, it will be appreciated that the limit element may be disposed in other positions on the pivot pin 28 with respect to the blades 10 and 12, in which case it may be required to turn the tabs in other directions or to provide slightly differently shaped tabs. If desired, a relatively small washer may be inserted between the lower blade 10 and the washer portion 44 of the limit element 42 to reduce or eliminate friction therebetween. The limit element 42 is loosely mounted on the pivot pin 28 so that same is free to rotate thereon if a blow be imparted to the element. However, when the blades are open, it will be apparent that engagement of the abutment portions 50 of the blades with the tabs 46 will automatically effect a centering action of the limit element 42 with respect to the blades so that the blades will always be limited in opening movement to the position shown in Figure 1. Likewise, when the blades are moved in closing direction, the limit element 42 will be automatically centered by engagement of the handle portions of the blades with the opposite sides of the third tab 48 to again automatically center the limit element in closed position, as is shown in Figure 2. From the foregoing, it will be apparent that the limit element can only become uncentered when the blades are opened to some point intermediate the two limits of movement thereof, but will always be automatically centered when the blades are moved to either limit thereof.

The third tab 48 of the limit element 42 is directed upwardly substantially higher than the tabs 46 and to an extent substantially in excess of the thickness of the two blades 10 and 12. At its upper end the tab is turned upon itself so as to provide a hinge portion 52. As will be apparent from a consideration of Figure 3, the hinge portion 52 of the abutment 48 is turned away from the housing 26. The hinge portion 52 is adapted for the reception of a pintle pin 54 by means of which a second or locking member or element 56 of the limit and locking means may be pivotally or hingedly connected to the limit element 42. The lock element 56 comprises a plate having two ears 58 at the upper portion thereof each forming a hinge 60 adapted for the reception of the pintle pin 54. The ear portions 58 are turned over upon themselves in much the same manner as the abutment 48, but the same are turned in the opposite direction, namely toward the housing 26, so as to provide a spacing between the body portion of the abutment 48 and the body portion of the lock element 56 when the same are mounted on the pintle pin 54, as will be apparent from a consideration of Figure 3.

At the central lower portion thereof, the lock element 56 is cut away, as at 62, but the outer edge portions thereof project downwardly to provide a pair of locking tabs or lugs or abutment portions 64, the inner edges of which are spaced apart by a distance equal to the distance between the outer edges of the handle portions of the blades when the blades are moved to closed position. The material of the upper portions of the lock member 56 at the outer edges thereof overlying the tabs 64 are turned downwardly and outwardly of the body away from the hinge 60 so as to provide a pair of thumb pieces 66 by means of which the lock element may be actuated with respect to the limit element 42. At the central upper portion thereof, the material of the lock member is removed so as to provide the spaced pair of hinges 60. The material originally comprising the upper central portion of the element is turned outwardly and downwardly in a manner similar to the thumb pieces 66 so as to provide a stop member 68, the purpose of which will be described in detail hereinafter.

In assembly, the hinge portions 60 of the lock member 56 are aligned with the hinge portion 52 of the limit member 42 and the pintle pin 54 is extended through the hinge portions to pivotally or hingedly connect the two elements. The limit element 42 has a relatively fixed mount on the pivot pin 28 and the lock element 56 is adapted for swinging movement with respect to the limit element 42 to move the lock tabs or abutment portions 64 of the lock member into and out of the path of movement of the blades. As will be apparent, the abutment portions 64 of the lock member 56 bridge the handle portions of the blades when the handle blades are moved to their closed positions so that the abutment portions 64 may be moved into the path of movement of the blades only when the blades are in their closed position, in which position, as is shown in Figures 2 and 3, the abutment portions 64 are adapted to lock the blades in closed position. When the lock member 56 is moved to locked position, as is best shown in Figure 3, the opening or cut-away portions 62 of the lock member receives the handle portions of the blades immediately adjacent the main pivot 14 and the inner edges of the abutment portions 64 of the lock member engage the outer edges of each blade. In the locked position, the thumb pieces 66 of the lock member extend generally parallel to the blades to provide convenient means for raising the lock member 56. When the lock member is swung to its upper position, that is out of the path of movement of the blades, as is shown in Figures 1 and 4, the lock member overlies the pintle pin 54 so that the center of gravity of the lock member is disposed beyond the center, whereby the lock member is retained in elevated position by its own weight. However, as will be apparent from Figures 1 and 2, the thumb pieces 66 of the lock member lie outwardly of the housing 26 so that it would be possible for the lock member to continue its rotation around the pintle pin 54 and back into the path of movement of the blades. To prevent the occurrence of such possibility, the central tab or stop member 68 of the lock member is provided so as to engage the housing 26 of the main pivot and thus to prevent travel of the lock member 56 around the pintle pin 54. The stop member 68 is shown as projecting generally parallel to the thumb pieces 66 of the lock member, but it will be appreciated that the stop member may be disposed at such angle with respect to the body of the lock member as may be necessary or desirable to provide for adjustment of the stopping or unlocked position of the member 56. While gravity is usually sufficient to hold the lock member 56 in its elevated or unlocked position, as is shown in Figure 4, it may be desirable to provide means for frictionally holding the lock member in its unlocked position. To this end, the hinge portions 60 of the lock member 56 could be tightly crimped to the pintle pin 54 and the pintle pin could have a tight frictional fit within the hinge portion 52 of the limit element 42. As an alternative, the pintle pin 54 could be curved at its central portion so as to form a modified detent in cooperation with the hinge portion 52 of the limit element so as to provide an over-center lock to retain the lock member in its elevated or unlocked position. With either of the latter schemes, the stop member 68 could be omitted, but since the material of the lock member 56 forming the stop member 68 would otherwise be wasted in stamping of the lock member from sheet metal, it will be apparent that the stop member 68 is provided without cost and is therefore preferably included in the structure.

Due to the self-centering action of the limit element 42, it will be apparent that the lock member 56 will also be automatically centered so as always to be capable of actuation when the blades are moved to their closed position to lock the blades in closed relationship.

As will be appreciated, grass shears are utilized only during the summer months or growing season and have no particular use during the non-growing season or winter months. Accordingly, the shears must be stored through the winter and, after such storage, it frequently occurs that the main pivot will require lubrication to render the shears operable with the ease and efficiency for which the same are designed. Heretofore, oiling or lubricating of the main pivot of the shears has been a somewhat tedious and messy operation. To avoid these disadvantages and to provide means whereby the main pivot may be readily lubricated without any particular care or attention, the housing element 26 is provided with an aperture 70 comprising an oil hole by means of which lubricant may be introduced into the interior of the housing. As will be appreciated, the housing 26 will properly direct the lubricant to the pivot pin 28 so that the oil will flow along the pivot pin, thus resulting in proper and efficient lubrication of the pin, the spring pressed member 30, the blades 10 and 12 and the limit member 42.

In construction, it is preferred that substantially all of the members or component parts of the shears of the present invention be formed of sheet metal stampings. In particular, it will be noted that every component part of the shears, with the exception of the springs 22 and 36, the bolt 28, the nut 34 and the pin 54, may be formed of sheet metal in conventional drawing and stamping operations. Accordingly, it will be appreciated that the shears of the present invention is extremely economical of manufacture. As will be appreciated from the foregoing description, the assembly of the various components of the shears is readily accomplished in an extremely convenient and economical manner. The resulting product is highly efficient, durable and extremely neat in appearance.

From the foregoing, it will be appreciated that the present invention provides an improved grass shears wherein the main pivot has no rigid or fixed connection with the other components of the apparatus, and yet provides for locating, positioning and securing all of the parts in operable relationship.

While I have described what I regard to be a preferred embodiment of my invention, it will be apparent that various changes, rearrangements and modifications may be made therein without departing from the scope of the invention, as defined by the appended claims.

I claim:

1. A shears comprising a pair of blades disposed in criss-cross relation, a pin pivotally connecting said blades at their point of intersection, said blades to one side of said pin presenting cutting edges and to the other side of said pin presenting handle portions, means separate of said blades, said separate means supporting said pin and resiliently retaining said blades on said pin, means carried by said pin and confined thereon by said separate means for limiting movement of said blades in both directions, said pin retaining all of said components in operative relation, and means carried by said last named means for locking said blades in closed position.

2. A shears comprising a pair of relatively movable blades, means pivotally connecting said blades, and a pair of relatively movable handles for actuating said blades, said means comprising a housing separate of said handles and said blades, a pivot pin having a head, said housing providing a first support for said pin remotely of said head, a member mounted on said pin for movement axially thereof, and means biasing said member towards said head, said blades being mounted on said pin and confined between said member and said head, said housing providing a guide for said member and said member providing a second support for said pin spaced substantially from said first support.

3. A shears comprising a pair of relatively movable blades, means pivotally connecting said blades, and a pair of relatively movable handles for actuating said blades, said means comprising a housing separate of said blades and said handles, a bolt having a head, said housing providing a first support for said bolt remotely of said head to which said bolt is removably secured, a member mounted on said bolt for movement axially thereof, and a spring confined between said first support and said member for biasing said member towards said head, said blades being mounted on said bolt and confined between said member and said head, said bolt comprising the sole connection between said blades, said member to the blade side thereof presenting a projection of reduced area about which said blades may rock, said housing providing a guide for said member and said member providing a second support for said bolt spaced substantially from said first support.

4. A shears comprising a pair of blades disposed in criss-cross relation, a pin pivotally connecting said blades at their point of intersection, said blades to one side of said pin presenting cutting portions and to the other side of said pin presenting handle portions, a housing separate of said blades, said housing providing a first support for said pin remotely of said blades, and a spring pressed member mounted on said pin for movement axially thereof, said member being guided by said housing and providing a second support for said pin remotely of said first support, said member resiliently retaining said blades on said pin in operative relation, said pin, said member and said housing being freely movable with respect to said blades except for the passage of said pin through said blades and the resilient retention of said blades on said pin by said member.

5. A shears comprising a pair of blades disposed in criss-cross relation, a headed bolt pivotally connecting said blades at their point of intersection, said blades to one side of said bolt presenting cutting portions and to the other side of said bolt presenting handle portions, a housing separate of said blades, a nut mounted in said housing and providing a first support for said bolt remotely of said blades, a member mounted on said bolt for movement axially thereof, and a spring confined between said nut and said member for biasing said member toward the head of said bolt, said member being guided by said housing and providing a second support for said bolt remotely of said nut, said member resiliently retaining said blades on said bolt in operative relation between said member and the head of said bolt, said member to the blade side thereof presenting a projection engaging one of said blades and providing a fulcrum about which said blades may pivot in a plane transversely of the plane of movement thereof, said bolt, said member and said housing being freely movable with respect to said blades except for the passage of said bolt through said blades and the resilient retention of said blades on said bolt by said member.

6. A shears comprising a pair of pivotally connected blade members, a pair of relatively movable handle members for actuating said blade members, and means for limiting movement of said members in both directions and for locking said members in a predetermined position, said means comprising a first element having abutment means disposed at spaced points in the path of movement of said members for blocking said members against further movement, and a second element movably mounted on said first element for movement into and out of the path of movement of said members, said second element being movable into the path of said members at a predetermined position of relative movement of said members within the limits of movement defined by said first element to prevent movement of said members.

7. A shears comprising a pair of blades, a pin pivotally connecting said blades, a pair of relatively movable handles for moving said blades about said pin, and means for limiting movement of said blades about said pin in both directions, said means comprising an element pivotally mounted on said pin and presenting spaced abutment portions in the path of movement of said blades, said abutment portions blocking movement of said blades, said element being freely mounted on said pin whereby said element is self-centering to maintain the predetermined limits of blade movement.

8. A shears comprising a pair of blades, a pin pivotally connecting said blades, a pair of relatively movable handles for moving said blades about said pin, and means for limiting movement of said blades about said pin in both directions and for locking said blades at one limit of movement, said means comprising a first element pivotally mounted on said pin and presenting spaced abutment portions in the path of movement of said blades, said abutment portions blocking movement of said blades, said first element being freely mounted on said pin whereby said first element is self-centering to maintain the predetermined limits of blade movement, and a second element pivotally mounted on said first element, said second element including abutment portions movable at one limit of movement of said blades into the path of movement of said blades to retain said blades at said one limit of movement, the abutment portions of said second element being movable out of the path of movement of said blades to accommodate actuation of said blades within the limits defined by said first element.

9. A shears comprising a pair of blades disposed in criss-cross relation, a pin pivotally connecting said blades at their point of intersection, said blades to one side of said pin presenting cutting portions and to the other side of said pin presenting handle portions, and a limit element pivotally mounted on said pin, said limit element presenting a pair of abutments projecting laterally of said blades and into the path of movement of said blades to limit opening movement of said blades, said limit element presenting a third abutment projecting between said handle portions and into the path of movement thereof to limit closing movement of said blades, said limit element being freely mounted on said pin whereby the same is self-centering under the action of said blades.

10. A shears comprising a pair of blades disposed in criss-cross relation, a pin pivotally connecting said blades at their point of intersection, said blades to one side of said pin presenting cutting portions and to the other side of said pin presenting handle portions, a limit element pivotally mounted on said pin, said limit element presenting a pair of abutments projecting laterally of said blades and into the path of movement of said blades to limit opening movement of said blades, said limit element presenting a third abutment projecting between said handle portions and into the path of movement thereof to limit closing movement of said blades, said limit element being freely mounted on said pin whereby the same is self-centering under the action of said blades, and a lock element pivotally mounted on said limit element and presenting spaced abutments bridging said handle portions at the closed limit of said blades, said abutments of said lock element being movable into the path of movement of said handle portions when the same are closed to lock said blades in closed position.

11. A shears comprising a pair of relatively movable blade members, means pivotally connecting said blade members, a pair of relatively movable handle members for actuating said blade members, said means comprising a housing separate of said members, a pivot pin having a head, said housing providing a first support for said pin remotely of said head, a member mounted on said pin for movement axially thereof, and means biasing said member towards said head, said blade members being mounted on said pin and confined between said member and said head, said housing providing a guide for said member and said member providing a second support for said pin spaced substantially from said first support, and means for limiting movement of said members in both directions and for locking said members in a predetermined position, said last-named means comprising a first element having abutment means disposed at spaced points in the path of movement of said members for blocking said members against further movement, and a second element movably mounted on said first element for movement into and out of the path of movement of said members, said second element being movable into the path of said members at a predetermined position of relative movement of said members within the limits of movement defined by said first element to prevent movement of said members.

12. A shears comprising a pair of blades disposed in criss-cross relation, means pivotally connecting said blades at their point of intersection, said blades to one side of said means presenting cutting edges and to the other side of said means presenting handle portions, said means comprising a pivot pin having a head, a housing providing a relatively fixed support for said pin remotely of said head, and a spring pressed member mounted on said pin for movement axially thereof, said blades being mounted on said pin and resiliently confined between said member and said head, said housing being separate of said blades, and means carried by said pin for limiting movement of said blades in both directions and for locking said blades in closed position, said last-named means comprising a limit member freely mounted on said pin and resiliently confined between said blades and said head and a lock member carried by said limit member, said limit member presenting spaced abutment portions in the path of movement of said blades to limit movement of said blades in both directions, said lock member including abutment portions movable with respect to said limit member and said blades in a plane transversely of the plane of movement of said blades into and out of the path of movement of said blades, the abutment portions of said lock member being movable into the path of movement of said blades when said blades are in the closed position defined by said limit member to prevent opening movement of said blades.

13. A shears comprising a pair of blades disposed in criss-cross relation, a pin pivotally connecting said blades at their point of intersection, said blades to one side of said pin presenting cutting portions and to the other side of said pin presenting handle portions, a housing separate of said blades, said housing providing a first support for said pin remotely of said blades, a spring pressed member mounted on said pin for movement axially thereof, said member being guided by said housing and providing a second support for said pin remotely of said first support, said member resiliently retaining said blades on said pin in operative relation, and a limit element pivotally mounted on said pin, said limit element presenting a pair of abutments projecting laterally of said blades and into the path of movement of said blades to limit opening movement of said blades, said limit element presenting a third abutment projecting between said handle portions and into the path of movement thereof to limit closing movement of said blades, said limit element being freely mounted on said pin whereby the same is self-centering under the action of said blades, said pin, said member and said housing being freely movable with respect to said blades and said limit element except for the passage of said bolt through said blades and said limit element and the resilient retention of said blades and said limit element on said pin by said member.

14. A shears comprising a pair of blades disposed in criss-cross relation, a headed bolt pivotally connecting said blades at their point of intersection, said blades to one side of said bolt presenting cutting portions and the other side of said bolt presenting handle portions, a housing separate of said blades, said housing providing a first support for said bolt remotely of said blades to which said bolt is removably secured, a member mounted on said bolt for movement axially thereof, a spring confined between said first support and said member for biasing said member toward the head of said bolt, said member being guided by said housing and providing a second support for said bolt remotely of said first support, said member resiliently retaining said blades on said bolt in operative relation between said member and the head of said bolt, said member to the blade side thereof presenting a projection engaging one of said blades and providing a fulcrum about which said blades may pivot in a plane transversely of the plane of movement thereof, a limit element pivotally mounted on said bolt, said limit element presenting a pair of abutments projecting laterally of said blades and into the path of movement of said blades to limit opening movement of said blades, said limit element presenting a third abutment projecting between said handle portions into the path of movement thereof to limit closing movement of said blades, said limit element being freely mounted on said bolt whereby the same is self-centering under the action of said blades, and a lock element pivotally mounted on the third abutment of said limit element and presenting spaced abutments bridging said handle portions at the closed limit of movement of said blades, said abutments of said lock element being movable into the path of movement of said handle portions when the same are closed to lock said blades in closed position, said lock element including a centrally disposed stop element adapted to engage said housing when said abutments of said lock element are moved out of the path of movement of said handle portions and into an elevated position above said third abutment of said limit element, said stop member retaining said lock element in elevated unlocked position, said bolt, said member and said housing being freely movable with respect to the other components of the shears but locating and retaining the other components of the shears in operative relation.

LUCIEN I. YEOMANS.

References Cited in the file of this patent

UNITED STATES PATENTS

| Number | Name | Date |
|---|---|---|
| 1,987,375 | Simonsen et al. | Jan. 8, 1935 |
| 2,140,288 | Heumann | Dec. 13, 1938 |
| 2,306,506 | Simonsen et al. | Dec. 29, 1942 |